No. 706,383. Patented Aug. 5, 1902.
W. F. CAHOON.
CULTIVATOR.
(Application filed Aug. 19, 1901.)
(No Model.) 2 Sheets—Sheet 1.
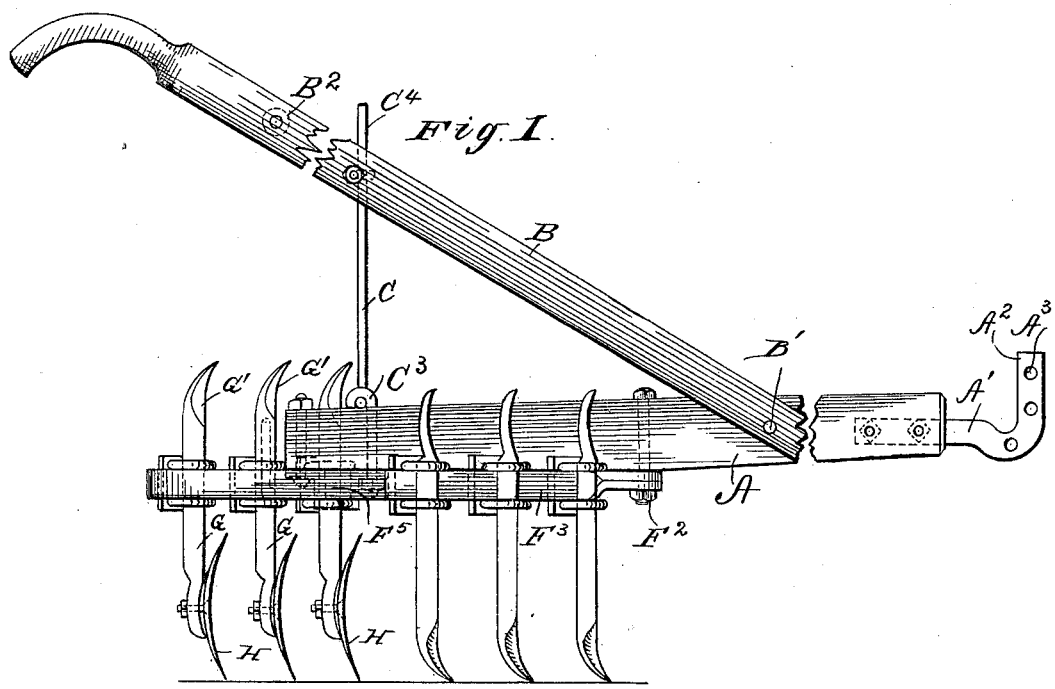
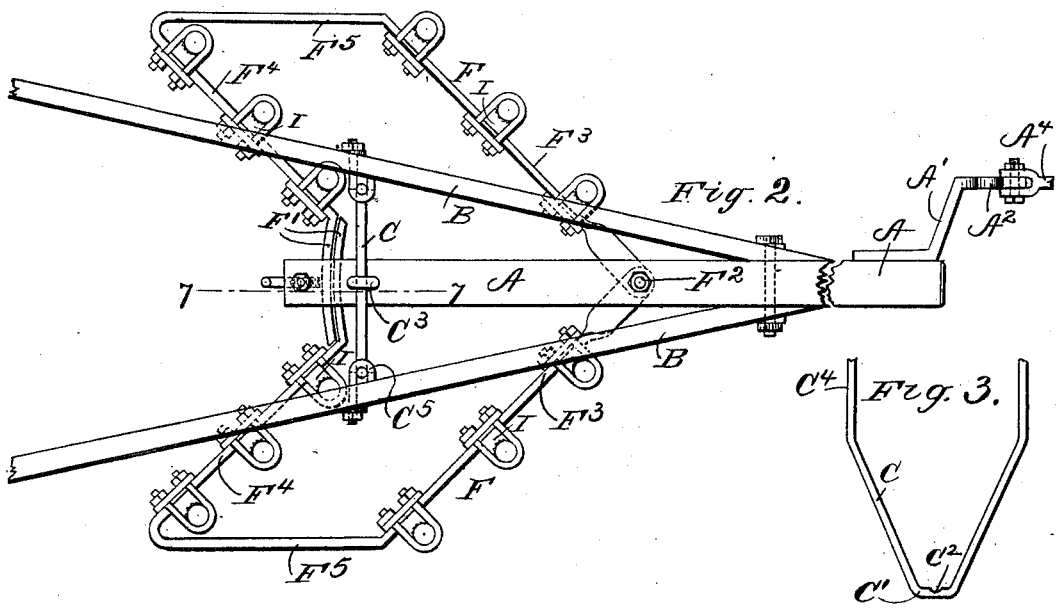
WITNESSES:
W. R. Edelen
Perry B. Turpin
INVENTOR
William F. Cahoon.
BY Munn & Co.
ATTORNEYS No. 706,383. Patented Aug. 5, 1902.
W. F. CAHOON.
CULTIVATOR.
(Application filed Aug. 19, 1901.)
(No Model.)  2 Sheets—Sheet 2.
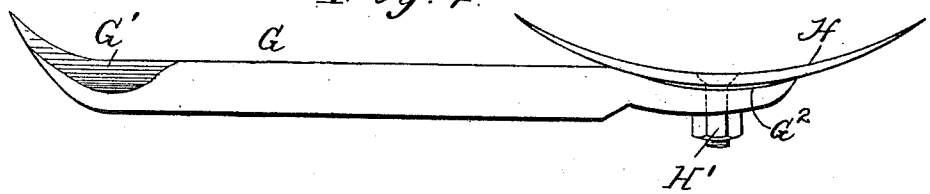
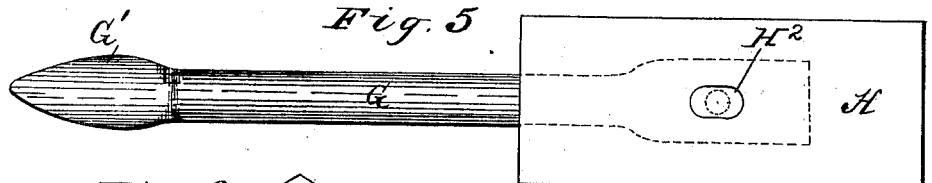
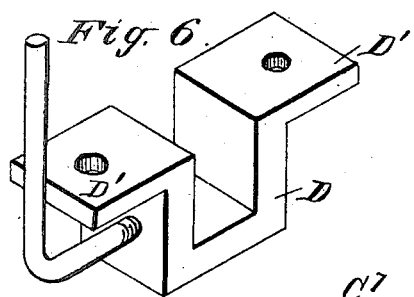
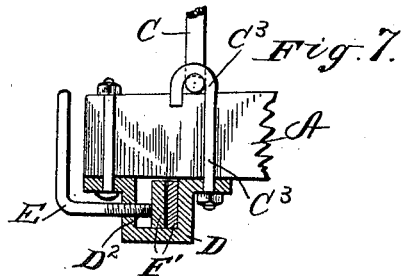
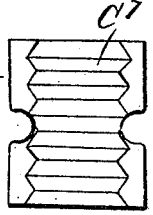
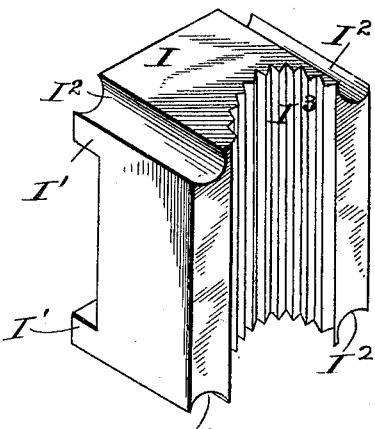
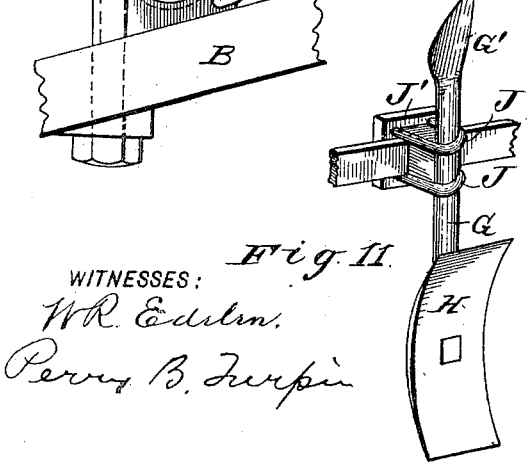
WITNESSES:
INVENTOR
William F. Cahoon.
BY Munn & Co.
ATTORNEYS

UNITED STATES PATENT OFFICE.

WILLIAM F. CAHOON, OF SKINNERSVILLE, NORTH CAROLINA.

CULTIVATOR.

SPECIFICATION forming part of Letters Patent No. 706,383, dated August 5, 1902.

Application filed August 19, 1901. Serial No. 72,505. (No model.)

*To all whom it may concern:*

Be it known that I, WILLIAM FRANKLIN CAHOON, a citizen of the United States, residing at Skinnersville, in the county of Washington and State of North Carolina, have made certain new and useful Improvements in Cultivators, of which the following is a specification.

My invention is an improvement in cultivators having for an object, among others, to provide bent teeth which operate in connection with the frame, so the teeth can be adjusted to throw to or from the plant, as may be desired; to afford facilities for the proper adjustment of the teeth independently of each other; to produce an implement that will thoroughly pulverize the soil before it is shoved up to the plant, in the use of which implement the amount of soil thrown to the plant can be varied, increased, or decreased without the use of extra teeth; to so shape the teeth that they will not ride the earth when hard places are encountered; to provide for adjustment so the teeth can be moved on the frame vertically or horizontally, and to so shape the frame that it can be opened or closed, and thus avoid loss of time necessary for moving the teeth.

The invention consists in certain novel constructions and combinations of parts, as will be hereinafter described and claimed.

In the drawings, Figure 1 is a side view, and Fig. 2 a top plan view, of a cultivator embodying my invention; and Fig. 3 is a detail view of the handle-stand. Fig. 4 is a side view, and Fig. 5 a face view, of one of the teeth provided at one end with a curved shovel. Fig. 6 is a detail perspective view of the keeper-clamp for the inner ends of the adjustable teeth-supporting frames. Fig. 7 is a detail sectional view on about line 7 7 of Fig. 2, illustrating the means for clamping the inner ends of the teeth-supporting frames of the cultivator. Fig. 8 is a detail top plan view illustrating one of the handle-supporting uprights and the means for clamping it to the handle. Fig. 9 illustrates in detail one of the clamping-blocks shown in Fig. 8. Fig. 10 is a detail perspective view of one of the clamp-blocks for use in securing the teeth to the tooth-supporting frame; and Fig. 11 is a detail perspective view of one of the teeth and the means for securing the same, all of which will be hereinafter described.

In constructing my cultivator I employ the beam A. The handles B are pivoted at their front ends at B' to the beam A and lie on opposite sides of said beam and are pressed apart near their rear ends by the distance piece or bar $B^2$. These handles B are supported from the beam A, near the rear end of the latter, by the stand C. This stand C is shown in detail in Fig. 3 of the drawings. This stand C is bent from a rod of metal, having at its middle the cross portion C' to fit upon the beam A and provided in said portion C' with a notch $C^2$ for engagement by the hook-bolt $C^3$, which operates to secure the stand firmly ot the beam, as best shown Fig. 7. The stand C has the upright portions or rods $C^4$, which extend along the inner sides of the handles B and are secured to the latter by the hook-bolts $C^5$, which pass through the handles and are secured by nuts, so they can be tightened up as desired. Tooth-blocks $C^6$ (shown in detail in Fig. 9) are arranged between the upright rods $C^4$ and the handles and are provided with the curved toothed sockets shown at $C^7$, against which the upright portions $C^4$ of the stand C are clamped by the hook-bolts $C^5$ to insure the clamping of the handles in the desired position upon the upright portions of the stand, as desired. By the described construction the handles may be adjusted to and held in any desired position.

Near its rear end the beam A is provided with the keeper-box D. (Shown in detail in Fig. 6 and applied in Figs. 1 and 7.) This keeper-box D has the lugs or flanges D', which lap beneath the beam A and are perforated for the passage of the bolts by which it is secured to the under side of the beam, as shown in Fig. 7. It will be noticed that the hook-bolt $C^3$ for securing the handle-stand C to the beam A is also arranged to secure the keeper-box D at the front side of the latter, as best shown in Fig. 7. This box has a threaded opening at $D^2$, through which it is entered by the clamping-screw E, which may be operated to bind the portions F' of the tooth-supporting frames in the keeper-box D and so hold the said frames in any desired adjustment. The frames F are provided at their rear ends with the portions F', which extend laterally within the keeper-box D, as shown in Fig. 2, so they may be engaged by the clamp E for the purpose of holding the frames F in any desired adjustment. At their front ends the frames F are secured at $F^2$ to the beam A, preferably by means of a bolt, as shown, upon which the frames can be swung in and out, as desired. The frames are alike, except that they are made rights and lefts or may be exactly alike and turned side for side to suit them for either side of the beam A and are each formed with the outwardly-extending portions $F^3$ and $F^4$, arranged one in rear of the other and inclined to the direction of draft and connected at their outer ends by the connecting portion $F^5$, the front and rear laterally-extending portions $F^3$ and $F^4$ being parallel with each other, as best shown in Fig. 2. By the described construction it will be noticed that the frames F can be adjusted upon a securing-bolt at $F^2$ in or out at their rear ends and secured in any suitable adjustment by the clamp E, before described, the keeper-box operating to receive the end portions F' of the frame and aiding in the clamping thereof, as desired. The teeth G are secured to the parallel front and rear portions $F^3$ and $F^4$ of the frames F, so they can be adjusted either vertically or rotatably to set their points G' or their shovels H at any desired height and at any desired angle to the plants. In securing this feature of my invention I provide clamp-blocks I for each tooth G, such blocks I being shown in detail in Fig. 10 and being provided near their upper and lower ends at their rear side with lugs I' to lap above and below the bars of the frames, as will be understood from Figs. 2, 10, and 11, and are also provided at their opposite sides with grooves $I^2$ for the arms of the U-shape bolts J, which are passed around the tooth, and with the arms lying within the grooves $I^2$, and thence through plates J' on the rear side of the frame-bars and secured by nuts, as shown. The clamp-blocks I are provided in their outer faces with the upright curved grooves $I^3$, which are toothed, as shown in Figs. 2 and 10, so the teeth can be clamped securely by the bolts J, as will be understood from Figs. 10 and 11.

The teeth G are provided with the points G' at one end and are curved at $G^2$ at their other end to receive the shovel H, which latter is secured by the bolts H', slotted openings being provided at $H^2$ to provide for a certain adjustment of the shovel, as may be desired.

It will be noticed that the seat $G^2$ and the blade H are curved on different arcs, leaving a space between them, into which the blade may be drawn when the bolt H' is tightened, giving a solid bearing for the shovel or blade H, as desired. It will also be noticed that the blades or shovels H may be reversed end for end when worn.

By the described construction it will be noticed the cultivator-teeth may be turned end for end whenever desired, can be adjusted up or down, and turned at any angle to the plants to throw the dirt toward or from the plants to any desired degree. The construction is simple, and each portion of the cultivator can be readily adjusted for the purposes described.

Having thus described my invention, what I claim as new, and desire to secure by Letters Patent, is—

1. The combination in a cultivator of the tooth-supporting frame-bar, the clamping-block having an upright curved groove for the tooth, and provided at its opposite ends with lugs or ears to overlap the frame-bar, and at such ends with grooves for the clamping-bolts, the tooth, and the U-shape clamping-bolts fitting around the tooth and in the grooves of the clamping-block, and securing the tooth and clamping-blocks in connection with the frame-bar, substantially as set forth.

2. In a cultivator, the combination of the beam, the handles, the keeper-box applied to the beam near its rear end, the bolts securing the said keeper-box to the beam, the handle-supporting stand held to the beam by one of said bolts, means securing the handles to the upright portions of said stand, the tooth-supporting frames having at their rear ends portions fitting within the keeper-box, and clamp devices for securing said portions in the keeper-box, substantially as set forth.

WILLIAM F. CAHOON.

Witnesses:
H. G. JACKSON,
JOHN M. BATEMAN.